G. PLATT.
Horse Hay-Rake.

No. 163,103.  Patented May 11, 1875.

WITNESSES:
E. Wolff
C. Sedgwick

INVENTOR:
G. Platt
BY
ATTORNEYS.

UNITED STATES PATENT OFFICE.

GLOUD PLATT, OF COLLIERSVILLE, NEW YORK.

IMPROVEMENT IN HORSE HAY-RAKES.

Specification forming part of Letters Patent No. 163,103, dated May 11, 1875; application filed March 13, 1875.

*To all whom it may concern:*

Figure 1:
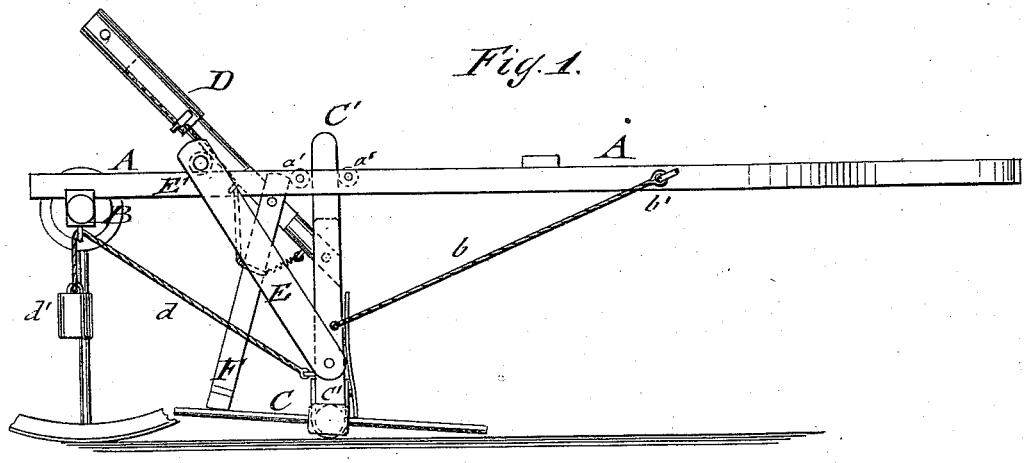
Figure 2:
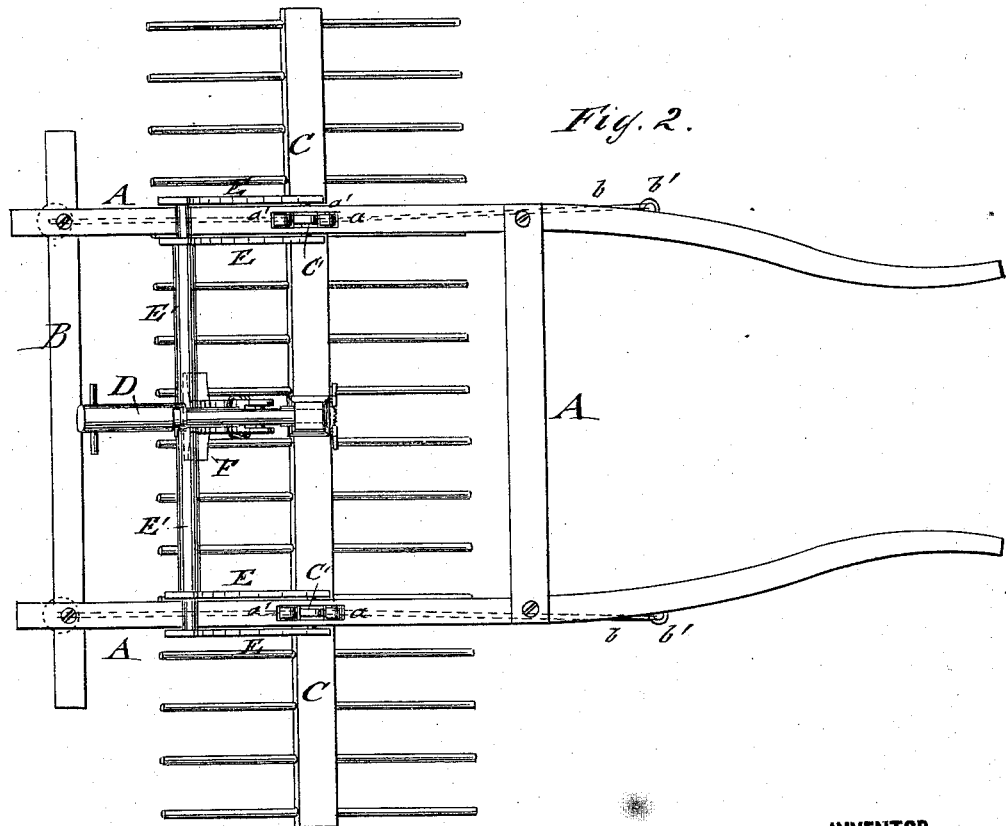

Be it known that I, GLOUD PLATT, of Colliersville, in the county of Otsego and State of New York, have invented a new and Improved Horse Hay-Rake, of which the following is a specification:

In the accompanying drawing, Figure 1 represents a side elevation, and Fig. 2 a top view, of my improved horse hay-rake.

Similar letters of reference indicate corresponding parts.

The object of my invention is to so improve the common revolving horse hay-rake, by placing it on wheels, that it may be operated from the driver's seat with greater facility and dispatch, remaining completely within control of the attendant.

My invention consists in suspending a common revolving hay-rake from a wheeled frame by means of a properly balanced and adjustable guide-frame, for being readily governed by the attendant seated on the wheeled frame, as hereinafter fully described.

In the drawing, A represents a supporting frame, which is provided with shafts for the horses and attached to the axle B of the rake-carrying wheels. A hay-rake, C, of the customary construction, is suspended from frame A by means of pieces C' hinged to it, which slide in slotted recesses a, with friction-wheels a' of the side pieces of frame A. The slide-pieces C' are connected by steadying front cords or chains b to staples b' on the shafts of the frame, and by rear cords d passing over pulleys or through staples of the axle B, with balance-weights d', for admitting the ready handling of the balanced rake, and carrying it quickly into any position by means of the rake-lever D. Additional pieces, E, are pivoted to the lower part of slide-pieces C', and are laterally connected by a rod, E', which slides along the top of frame A, and serves, in connection with the handle, to raise or drop the rake as required.

The rake is revolved in the usual manner on the release of a pivoted spring-standard, F, operated by suitable mechanism from the rake-lever, so as to produce the swinging over of the rake and the depositing of the hay. On the completion of this semi-rotation, the rake is locked by suitable devices, and the standard F resumes its position on the rear rake-teeth, so as to enable the attendant to work the rake, in connection with the lever-handle and lateral guide-rod, from his seat on the wheeled frame, with the greatest facility, and with greater rapidity than if walking with the horse-rake. The higher position of the attendant also enables him to observe inequalities or obstructions, and to prevent thereby damage to the rake, by raising it quickly to pass over the obstructing parts.

Having thus described my invention, I claim as new and desire to secure by Letters Patent—

The combination, with the revolving rake, operating lever d, hinged slide-pieces C, and wheeled supporting frame of the cords and weights b d d', and supporting frame E E', all constructed and arranged to operate substantially in the manner and for the purpose specified.

GLOUD PLATT.

Witnesses:
MELVILLE KEYES,
E. A. SCRAMLING.